(12) United States Patent
Friedman et al.

(10) Patent No.: US 10,473,694 B2
(45) Date of Patent: Nov. 12, 2019

(54) OPTICAL SOURCE IN MICROWAVE IMPEDANCE MICROSCOPY

(71) Applicant: Primenano, Inc., Santa Clara, CA (US)

(72) Inventors: Stuart L. Friedman, Palo Alto, CA (US); Michael M. Kelly, Portola Valley, CA (US)

(73) Assignee: Primenano, Inc., Santa Clara, CA (US)

( * ) Notice: Subject to any disclaimer, the term of this patent is extended or adjusted under 35 U.S.C. 154(b) by 0 days.

(21) Appl. No.: 16/383,109

(22) Filed: Apr. 12, 2019

(65) Prior Publication Data

US 2019/0234993 A1 Aug. 1, 2019

Related U.S. Application Data

(63) Continuation of application No. 15/421,163, filed on Jan. 31, 2017, now Pat. No. 10,274,513.

(51) Int. Cl.
*G01Q 60/24* (2010.01)
*G01Q 60/30* (2010.01)
*G01Q 60/60* (2010.01)

(52) U.S. Cl.
CPC .................... *G01Q 60/30* (2013.01)

(58) Field of Classification Search
CPC ......... G01Q 60/24; G01Q 60/30; G01Q 60/60
See application file for complete search history.

(56) References Cited

U.S. PATENT DOCUMENTS 5,049,816 A * 9/1991 Moslehi ............ G01R 31/2656
324/754.23

7,190,175 B1 3/2007 Kelly et al.
(Continued)

FOREIGN PATENT DOCUMENTS

CN 105137126 A 12/2010

OTHER PUBLICATIONS

Uehara et al., "Optical beat-mode frequency stabilization between two lasers using a radio frequency interferometer in the gigahertz frequency band," Optical Engineering, vol. 52, No. 12, pp. 124109 et seq., 2014.

(Continued)

*Primary Examiner* — Nicole M Ippolito
*Assistant Examiner* — Sean M Luck
(74) *Attorney, Agent, or Firm* — Charles S. Guenzer

(57) ABSTRACT

A system for atomic force microscopy in which a sharp electrode tip of an flexing probe cantilever is positioned closely adjacent a sample being probed for its electrical characteristics. An optical beam irradiates a portion of the sample surrounding the probe tips and is modulated at a radio or lower modulation frequency. In one embodiment, a reference microwave signal is incident to the electrode tip. Microwave circuitry receives a microwave signal from the probe tip, which may be the reflection of the incident signal. Electronic circuitry processes the received signal with reference to the modulation frequency to produce one or more demodulated signals indicative of the electronic or atomic properties of the sample. Alternatively, the optical beam is pulsed and the demodulated signal is analyzed for its temporal characteristics. The beam may non-linearly produce the microwave signal. Two source lasers may have optical frequencies differing by the microwave frequency.

20 Claims, 5 Drawing Sheets

(56) References Cited

U.S. PATENT DOCUMENTS

| | | |
|---|---|---|
| 7,816,917 B2 | 10/2010 | Cho |
| 8,266,718 B2 | 9/2012 | Lai et al. |
| 8,307,461 B2 | 11/2012 | Li et al. |
| 2003/0071605 A1 | 4/2003 | Kelly et al. |
| 2008/0011065 A1 | 1/2008 | Su et al. |
| 2010/0218286 A1 | 8/2010 | Lai et al. |
| 2011/0036169 A1 | 2/2011 | Shekhawat et al. |
| 2012/0167261 A1 | 6/2012 | Belkin et al. |
| 2013/0283487 A1 | 10/2013 | Wickramasinghe |

OTHER PUBLICATIONS

Fessenden et al., "Minority carrier lifetime in thin films of Zn3P2 using microwave and optical transient measurements," Thin Solid Films, vol. 266, pp. 176-181, 1995.

Molecular Vista, "PIFM," www.molecularvista.com/technology/pifm, Oct. 5, 2016.

Anasys Instruments, "AFR-IR technology for nanoscale IR spectroscopy and imaging," www.anasysinstrruments.com/technology/nanoir-technology, Oct. 24, 2016.

PCT International Search Report, PCT/US2017/066477, dated Apr. 9, 2018.

PCT Written Opinion of the International Searching Authority, PCT/US2017/066477, dated Apr. 9, 2018.

Sun Yat-Sen University, "A Novel Nitrogen Vacancy Color Center Diamond Magnetometer," CN 105137126 A, English translation.

Anasys Instruments, "True model free nanoscale IR absorption spectroscopy," www.anasysinstruments.com/products/nanoir2-f2, Oct. 24, 2016.

\* cited by examiner

OPTICAL SOURCE IN MICROWAVE IMPEDANCE MICROSCOPY

RELATED APPLICATION

This application is a continuation of Ser. No. 15/421,163, filed 31 Jan. 2017 and issue fee paid, incorporated herein by reference in its entirety.

FIELD OF THE INVENTION

The invention relates generally to material measurement systems. In particular, the invention relates to atomic force microscopy.

BACKGROUND ART

Electrical measurement systems and techniques have long been used to characterize the properties of bulk materials, for example, resistivity, permittivity and permeability. These techniques have been adapted to measure characteristics of surfaces and thin films and have been combined with optical techniques for measuring further properties such as semiconductor type and concentrations and chemical bonding. Attempts to apply these electrical and optical techniques to the fine surface structures developed in semiconductor integrated circuits (ICs) have been stymied by the small scale of modern IC features, typically well below 100 nm, such that most measurement probes and beams average over the different features of the IC.

Atomic force microscopy has been developed to profile the topography of a specimen with a resolution of 10 nm and less. One type of atomic force microscope (AFM) includes a mechanical probe with a tip positioned at the end of a flexible cantilever. The tip is tapered to have an apex having a diameter of, for example, less than 50 or 100 nm though 5 nm is currently achievable. The sharp tip is typically realized through anisotropic etching of crystalline silicon to form sharp pyramidal tips with dimensions of a few silicon crystalline spacings although other tapered shapes such as conical can be formed and including different materials. Through atomic interactions between the tip and specimen sufficient to affect the cantilever flexing, the probe tip can be made to hover a small fixed distance above the specimen as the tip is scanned over the specimen. Thereby, the specimen surface can be profiled by such a mechanical AFM with vertical and horizontal resolutions on the order of nanometers.

Commercial products are available in which an infrared beam irradiates the sample adjacent the tip of a mechanical AFM. In one product from Anasys, we believe the infrared beam causes the sample to thermally expand, which expansion is measured by the mechanical AFM. Thereby, the infrared absorption can be measured. In another product from Molecular Vista, we believe the infrared beam affects the atomic interaction between the sample and the AFM tip as the infrared is absorbed in the sample.

As described by Lai et al. in U.S. Pat. No. 8,266,718, incorporated herein by reference, atomic force microscopy has been combined with microwave measurement techniques to incorporate a microwave probe into the AFM cantilever tip. A conventional AFM system automatically scans the microwave tip closely adjacent a sample surface to electrically characterize small areas of the sample and thus image the electrical characteristics of the scanned surface. Li et al. describe an improved microwave probe tip in U.S. Pat. No. 8,307,461. Their microwave probe tips tend to be relatively blunt, fragile, and complex and are not beneficially used in a mechanical AFM designed for topographic profiling. PrimeNano, Inc. of Santa Clara, Calif. markets the ScanWave™ module for AFMs to provide high-resolution imaging of permittivity and conductivity of materials at the nanoscale.

Infrared absorption is often used to characterize materials, particularly semiconductors. Infrared absorption may be measured by comparing the intensity of infrared radiation incident on a sample and that of the radiation exiting the sample.

Carrier lifetime is an important quantity in semiconductor materials, for example, minority carrier lifetimes should be maximized in photovoltaic devices. Carrier lifetimes can be measured by placing a semiconducting sample into a macroscopic microwave cavity. The properties of the resonant cavity will vary according to the conductivity of the sample. If the sample is pulsed with laser light, the conductivity will decay on a time scale proportional to the carrier lifetime. As a result, the carrier lifetime can be extracted from the time dependent changes in the properties of the resonant cavity.

However, the spatial resolution of optical techniques is usually limited by the size of the beam illuminating the sample, typically on the order of microns or larger. It is desired to measure infrared absorption and carrier lifetimes on a much finer resolution.

SUMMARY OF THE INVENTION

In a broad aspect of the invention, a material characterization system combines atomic force microscopy (AFM), microwave impedance measurement using an AFM probe tip operating as an electrode, and a modulated beam of light incident on an area of the sample surrounding the probe tip. The light beam may be temporally modulated (e.g. varying amplitude as a function of time) at a sensing frequency or other rate or wavelength modulated (varying wavelength as a function of time) as the frequency of the light is scanned. Electronic circuitry receives a microwave signal from the probe tip and demodulates it according to the sensing frequency. The invention may also use a blunter tip and need not have AFM capabilities.

In another aspect of the invention, microwave circuitry impresses a reference microwave signal on the probe tip and receives a microwave signal reflected from the reference microwave signal by the sample.

In a further aspect of the invention, a trigger generator pulses a light source producing the beam of light and the microwave signal reflected from or otherwise generated in the sample into the probe tip is monitored to measure the decay or other time profile of the reflected signal.

In yet another aspect of the invention, a modulated light irradiates a sample having a non-linear characteristic such that a microwave signal is thereby generated and detected by the probe tip.

In a still further aspect of the invention, two lasers are controlled to output laser beams differing by a difference frequency. The beams are combined and irradiate a sample and microwave or other radiation detected from the sample is demodulated by an electrical signal derived from the difference frequency.

In a process aspect of the invention, a light source is modulated and its beam is directed to irradiate a sampling area of a specimen. A nanoscale electrode tip is positioned on or vertically adjacent the sampling area and microwave signals detected by the tip are processed with reference to the light source modulation to determine a characteristic of the specimen.

In a further process aspect of the invention, a microwave signal is applied to the electrode tip and its reflection or interaction with the specimen produces the detected microwave signal. The processing of the detected microwave signal may be compared to the applied microwave signal.

DETAILED DESCRIPTION OF THE PREFERRED EMBODIMENTS

According to one aspect of the invention, a sample can be irradiated with a relatively large beam of light and the electronic or atomic effect of that light on the sample can be measured by microwave impedance microscopy based upon an atomic force microscope (AFM). Thereby, the sample can be characterized with resolution determined mostly by the AFM and not by the optical beam.

Figure 1:
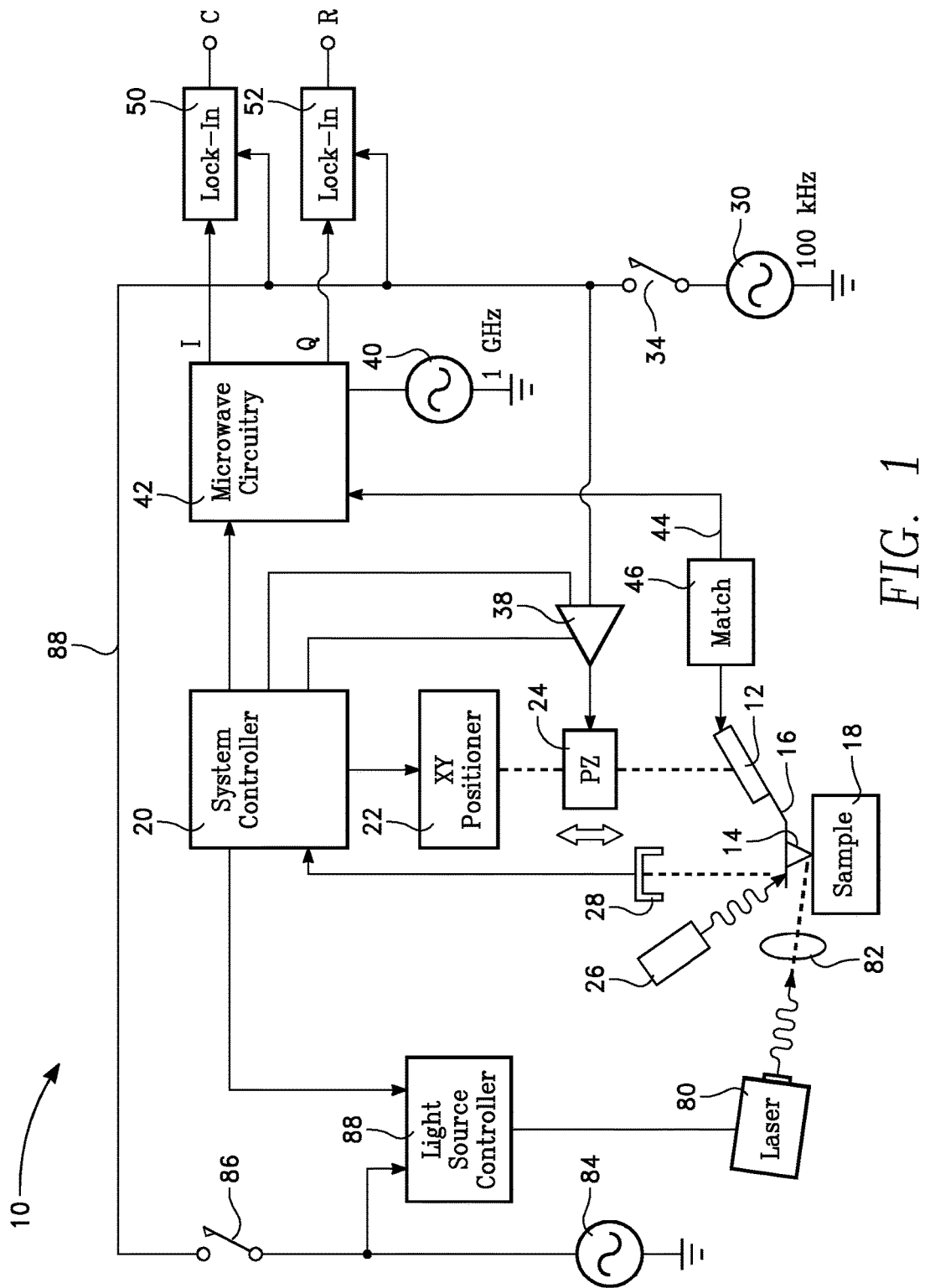
FIG. 1 is a block diagram of an optically excited microwave impedance microscope system of the invention.

In one embodiment of the invention especially directed to infrared absorption although it is not so limited, an optically excited microwave impedance microscope system 10 is illustrated in the block diagram of FIG. 1. The system follows the disclosure by Lai et al. in U.S. Pat. No. 8,266, 718. It includes a microwave probe 12, for example, that described by Li et al. in U.S. Pat. No. 8,307,461. The probe 12 includes a probe tip electrode 14 positioned on a distal end of a flexible cantilever 16 and interacting with a sample 18 held on an unillustrated support table. The tip electrode 14 extends and is tapered along an axial direction, vertical as illustrated, with a nanoscale apex having a diameter of preferably less than 100 nm. As will be described later in more detail, a beam of light or other radiation irradiates an area of the sample 18 surrounding the tip electrode 14 as it contacts or approaches the sample.

Under the control of a system controller 20, an XY positioner 22 supporting the probe 12 through an unillustrated holder determines the x and y positions and possibly the coarse z position of the probe tip electrode 14 relative to the sample 18. However, a piezo-electric transducer 24 is interposed between the XY positioner 20 and the probe 12 to provide fine control of the z position of the probe tip electrode 14. Alternatively, a holder with its mounted sample 18 is moved in one or more of the three directions. A light source 26, for example a laser, directs a beam of light to the reflective cantilever 16 and a light detector 28, such as a photodiode array, detects the position of the light beam reflected from the cantilever 16 and supplies that signal to the system controller 20. The position of the detected reflected light depends on the bending of the cantilever 16 and hence the physical interaction of the probe tip electrode 14 with the sample 18. The system controller 20 can thereby direct the piezo-electric transducer 24 to adjust the height of the probe 12 to bring the deflection of the cantilever 16 and hence the separation of the probe tip electrode 14 from the sample 18 back to desired values. The position of the tip 14 above the sample 18 may be detected by other means than optically detecting the cantilever bending. For example, piezo resistive detection of cantilever bending or by optical interferometry to detect the vertical position of the cantilever end or other tip support. A tuning fork can be substituted for the cantilever. Other techniques are available to measure the vertical tip position.

Once the z position of the tip electrode has been determined and possibly other measurements made, the XY positioner 22 may move the probe 12 and its tip electrode 14 in a predetermined path to repeat the operation at multiple points on the sample 18 and thereby scan the sample 18. Alternatively, the sample itself may be scanned.

In sub-embodiments of tapping mode or floating operation, a low-frequency electrical source 30 provides an oscillatory signal at a low frequency $f_{LF}$ through a closed switch 34 on a line to a driver 38 that applies a drive signal to the piezo-electric transducer 24 and hence causes the vertical position of the probe tip electrode 14 to vertically oscillate. In tapping mode, the oscillation causes the tip electrode 14 to intermittently contact the sample surface in the region of repulsive van der Walls forces but to return usually to a height of attractive van der Waals force. In floating mode, the oscillations occur completely away from the physical sample surface but at least a portion occurs within the range of attractive van der Walls forces from the surface. In both modes, the absolute height of the probe tip can be monitored by summing the cumulative vertical movement of the piezoelectric transducer 24 or monitoring the drive signal applied to the piezo-electric transducer 24 to thereby profile the surface topography as the probe 12 is scanned over the surface. The oscillatory signal may be sinusoidal or square wave and the low frequency $f_{LF}$ is typically at or near the mechanical resonant frequency of the cantilever 16 of the probe, for example, about 140 kHz to thereby minimize the drive power delivered to the piezoelectric transducer 24. However, the probe can be engineered for different resonant frequencies, for example, between 30 and 300 kHz.

In another sub-embodiment of virtual contact operation, the switch 34 is opened so the low-frequency source 30 does not oscillate the piezo-electric transducer 24. Instead, the system controller 20 responsive to the detector 28 of cantilever reflection controls the probe tip 14 to be in a region of strongly repulsive van der Waals force, that is, to virtually contact the surface. Thereby, the topography of the surface is followed and can be monitored and its characteristics measured.

The system controller 20 controls the XY positioner 22 to achieve two-dimensional scanning. It further controls through the driver 38 the amplitude of the piezo-electric drive signal and hence the vertical position of the apex of the probe tip 14 and the amplitude of any probe oscillations. Most of the aforementioned capabilities other than the AFM probe tip usable as an electrode are available in many commercially available AFMs.

To achieve the impedance imaging of Lai et al., a microwave source 40 outputs a signal at a microwave frequency $f_{MW}$, for example 1 GHz, to a microwave circuitry 42, which outputs a microwave probe signal to the tip 14 of the probe 12 and receives a reflected microwave signal from it. A microwave signal may be considered any electrical signal at a frequency of greater than 100 MHz and conveniently below 40 GHz, but typically between 500 MHz and 15 GHz and more preferably between 1 and 4 GHz. By the use of directional couplers and mixers in the microwave circuitry 42, a single microwave transmission line 44 may be used between the microwave circuitry 42 and the probe 12 and only one of the probe traces is used for the microwave signals although grounds and other shielding lines are advantageously included, as has been described by both Li et al. and Lai et al. In the usual configuration, the transmission line 44 is a 50 ohm coaxial cable having a center conductor carrying the microwave signal and a cylindrical outer conductor that is grounded and connected to the principal signal ground of the probe.

For optimum sensitivity, an impedance matching network 46 as described by Lai et al. is needed in close proximity to the probe 12 to match the high tip/sample impedance to the standard 50 ohm impedance of the one or more coaxial transmission lines 44. The microwave circuitry 42 may include, as described later with reference to FIG. 2, a microwave mixer mixing the reflected microwave signal from the probe 12 with the unmodulated microwave signal from the microwave source 40 to produce a signal representing the microwave amplitudes of the in-phase and quadrature microwave signals having amplitudes I and Q and their variations at frequencies much lower than the microwave frequency $f_{MW}$. The I and Q amplitude signals are delivered to two frequency-sensitive detectors 50, 52 such as lock-in amplifiers referenced to the low-frequency modulation frequency signal at $f_{LF}$ from the low-frequency source 30 to produce the respective differentials C of the in-phase signal I and R of the quadrature signal Q relative to the tapping frequency $f_{LF}$. The lock-in amplifiers 50, 52 can be replaced with detector systems sensitive to a very narrow bandwidth around the modulation frequency.

Figure 2:
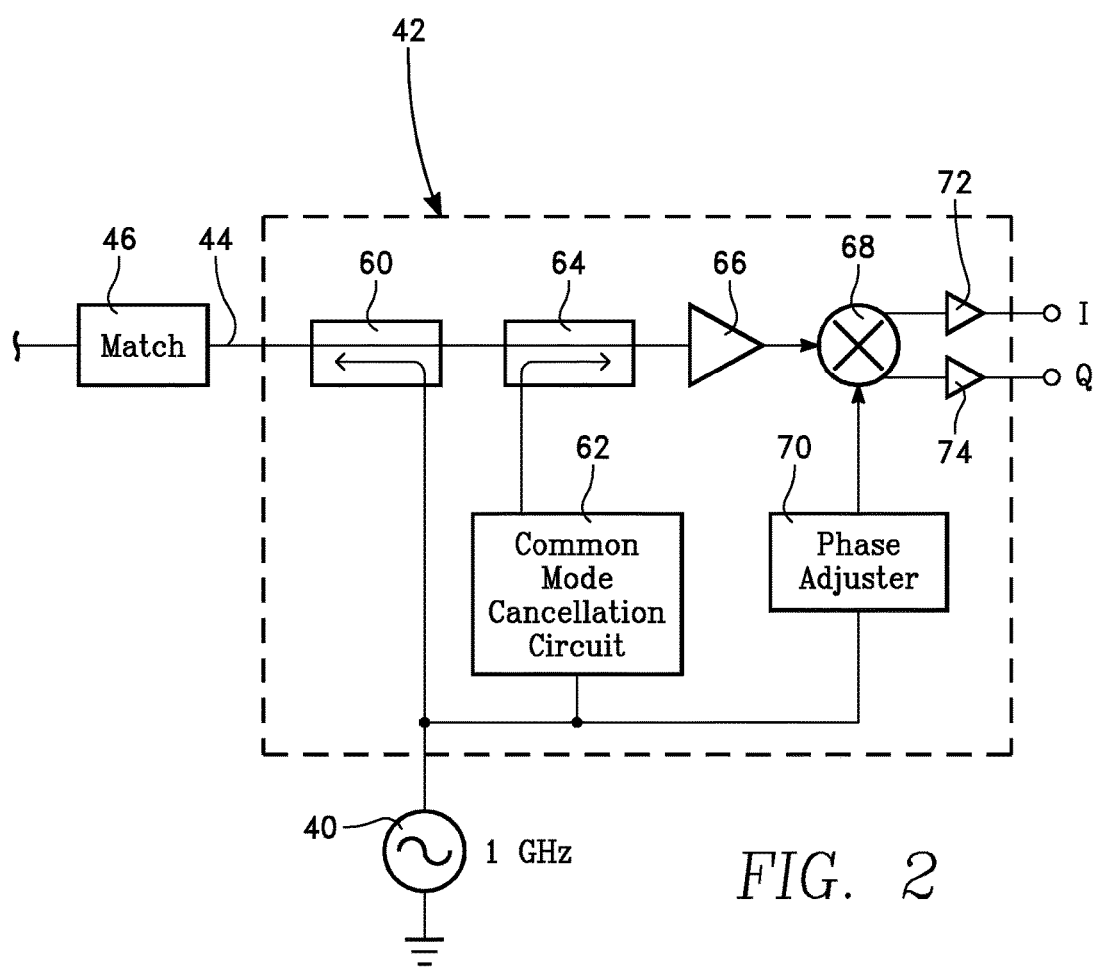
FIG. 2 is a block diagram of a version of the microwave circuit of FIG. 1.

An improved microwave circuit 42 is illustrated in the block diagram of FIG. 2. A first directional coupler 60 couples the reference microwave signal from the microwave source 40 onto the coaxial line 44 through the matching circuit 46 to the probe 12. It also receives the reflected microwave signal from the probe 12 on the same coaxial line 44, thereby eliminating the need for a second high-frequency line. A common mode cancellation circuit 62 also receives the reference microwave signal from the microwave source 40 and with phase shifters and attenuators prepares a signal that cancels undesired portions of the reflected microwave signal when a second directional coupler 64 combines the two signals. A microwave amplifier 66 amplifies the compensated reflected microwave signal before it is applied to a first input of a microwave mixer 68. A phase adjuster 70 adjusts the phase of the reference microwave signal from the microwave source 40 before applying it to a second input of the mixer 68. The low-frequency imaginary and real outputs of the mixer 68 are amplified by respective amplifiers 72, 74 to produce the I and Q signals applied to the lock-in amplifiers 50, 52. The described microwave capabilities are available in the Scan-Wave module available from PrimeNano and the circuit is similar to that described by Kelly in U.S. Pat. No. 7,190,175.

In the first embodiment of the invention illustrated in FIG. 1, a light source 80 outputs a beam through optics 82 to irradiate a portion of the sample 18 surrounding the probe tip electrode 14. In one embodiment, the light source 80 is temporally modulated by a modulating electrical source 84 through a light source controller 88. For infrared absorption, the light source 80 is preferably a tunable infrared laser outputting a laser beam at selectable wavelengths in the 3 to 12 micrometer range as controlled by the light source controller 88 under the direction of the system controller 20.

The frequency of the modulating source 80 and indeed its waveform can be widely chosen depending upon the configuration of the rest of the system. Its frequency or other time characteristic may be used to demodulate the detected microwave signal. The modulation frequency may be off the resonant cantilever frequency, for example 100 kHz, although other frequencies may be chosen, for example 10 kHz to 500 kHz but tunable infrared lasers are available which can be modulated or pulsed up to at least 3 MHz. Diode lasers can be modulated at much higher frequencies.

In one mode of operation, the switch 34 is opened to disconnect the low-frequency oscillator 30 from the lock-in amplifiers. Instead, a switch 86 is closed on a line 88 from the modulating source 84 to the reference inputs of the lock-in amplifiers 50, 52 so that they demodulate the detected microwave signal according to the modulating source 84. If the laser 80 can be modulated at microwave frequencies, the modulating source 84 may be replaced by a signal from the microwave source 40.

In an embodiment of intermittent tapping mode, the low-frequency source 30 oscillates the cantilever at a frequency well below its resonance and the detected microwave signal is inspected only during the part of the oscillation when the tip 14 is in or close to contact with the sample 18. That is, both oscillators or wave sources 30, 84 are used but additional timing circuitry is implemented to activate the microwave circuitry 42 or lock-ins 50, 52.

The temporal modulation of the light source facilitates signal detection but is not required for obtaining an absorption or other spectrum, which can be done by scanning the wavelength of an unmodulated laser. This may be considered to be wavelength modulation of a CW light source or laser. That is, the modulation may be temporal or wavelength-based or both.

The microwave circuitry 42 impresses the microwave signal from the microwave source 40 through the electrode tip 14 upon the sample 18 and receives the reflected microwave signal along substantially the same path. The I and Q outputs include components at relatively low frequencies representative of the material characteristics of the sample 18. The lock-in amplifiers 50, 52 referenced to the modulation frequency of the optical radiation from the laser 80 output C and R outputs representative of the permittivity and conductivity of the localized area of the sample 18 around the probe tip.

Carrier concentrations can be determined by measuring photoconductivity. The R conductivity output of the lock-in amplifier 52 is monitored while a laser beam irradiates the sample with a single laser infrared wavelength, which has energy typically less than the bandgap of the semiconductor though other wavelengths may be used. For silicon, the intra-gap wavelength is greater than about 1.2 µm. The R conductivity output will represent the difference of conductivities of the localized area of the sample with and without optical excitation. Alternatively, the C capacitance output of the lock-in amplifier 50 can also be used to measure carrier concentration since the capacitance is sensitive to the depletion layer thickness, which depends on the carrier concentration. A wide-band optical source 80 can also measure carrier concentrations if it is properly filtered to exclude inter-band radiation, that is, wavelengths less than 1.2 µm.

Infrared absorption is usually measured by infrared spectroscopy in which absorption depends on molecular or vibrational states and is measured at a series of wavelengths across an infrared band such as the aforementioned 3 to 12 µm band.

Tunable infrared lasers are available that can be modulated at up to 3 MHz. Single-wavelength diode lasers can be modulated into the gigahertz range. In the absence of signal processing between the cantilever and optical oscillations, optical modulation should avoid the cantilever oscillation frequency if any. The optical modulation frequency should be high enough to provide a high sampling rate for electrically profiling the scanned sample surface, for example, above 1 or 10 kHz.

A preferred laser light source 80 for the tunable infrared light source is an external cavity quantum cascade laser which includes a semiconductor structure providing optical gain over a broad wavelength range. The angle of a grating included in its external cavity can be adjusted to tune over a fairly broad range of wavelengths. To cover the desired broad wavelength range, the light source 80 may contain multiple laser modules, each spanning a subset of the wavelength range. Such lasers can be modulated or pulsed at kilohertz to megahertz frequencies by the low-frequency source 30. Alternatively, the laser light source 80 may be an optical parametric oscillator (OPO). A two-stage OPO laser system available from Anasys is tunable from 900 to 2000 $cm^{-1}$ and from 2234 to 3600 $cm^{-1}$. Alternatively, the light source 80 may be modulated by an external modulator in its output beam. Rotating blade choppers and photoelastic modulators operate in ranges below about 100 kHz.

This invention is not limited to infrared illumination beams. Many laser technologies including diode lasers output coherent beams in the visible and near infrared bands. Some are tunable over wide ranges; others over relatively narrow bands by thermal tuning, for example, laser diodes. In the 2 to 3.5 µm range fiber lasers have some tenability and can be modulated. Diode laser are suitable below about 2 µm down to the visible and even ultraviolet. These can be directly modulated at gigahertz frequencies and can generate picosecond scale pulses as well. Although the invention is particularly useful with optical radiation in the 3 to 12 µm band, the invention applies also to far-infrared radiation extending up to 100 µm and to terahertz radiation extending above 100 µm. Also, the optics described for the invention can accommodate near-infrared radiation in the 0.8 to 3 µm band, visible radiation in the 0.4 to 0.8 µm band, and ultra-violet radiation in the 0.1 to 0.4 µm band. The concept of optical excitation can be extended to vacuum ultraviolet and soft and hard x-rays with use of different optics and modulation techniques.

The light modulation can be moved into the microwave region by combining the outputs of two laser sources with lasing outputs differing in frequency by a microwave frequency, e.g. 3 GHz. See discussion below for FIG. 5.

Figure 3:
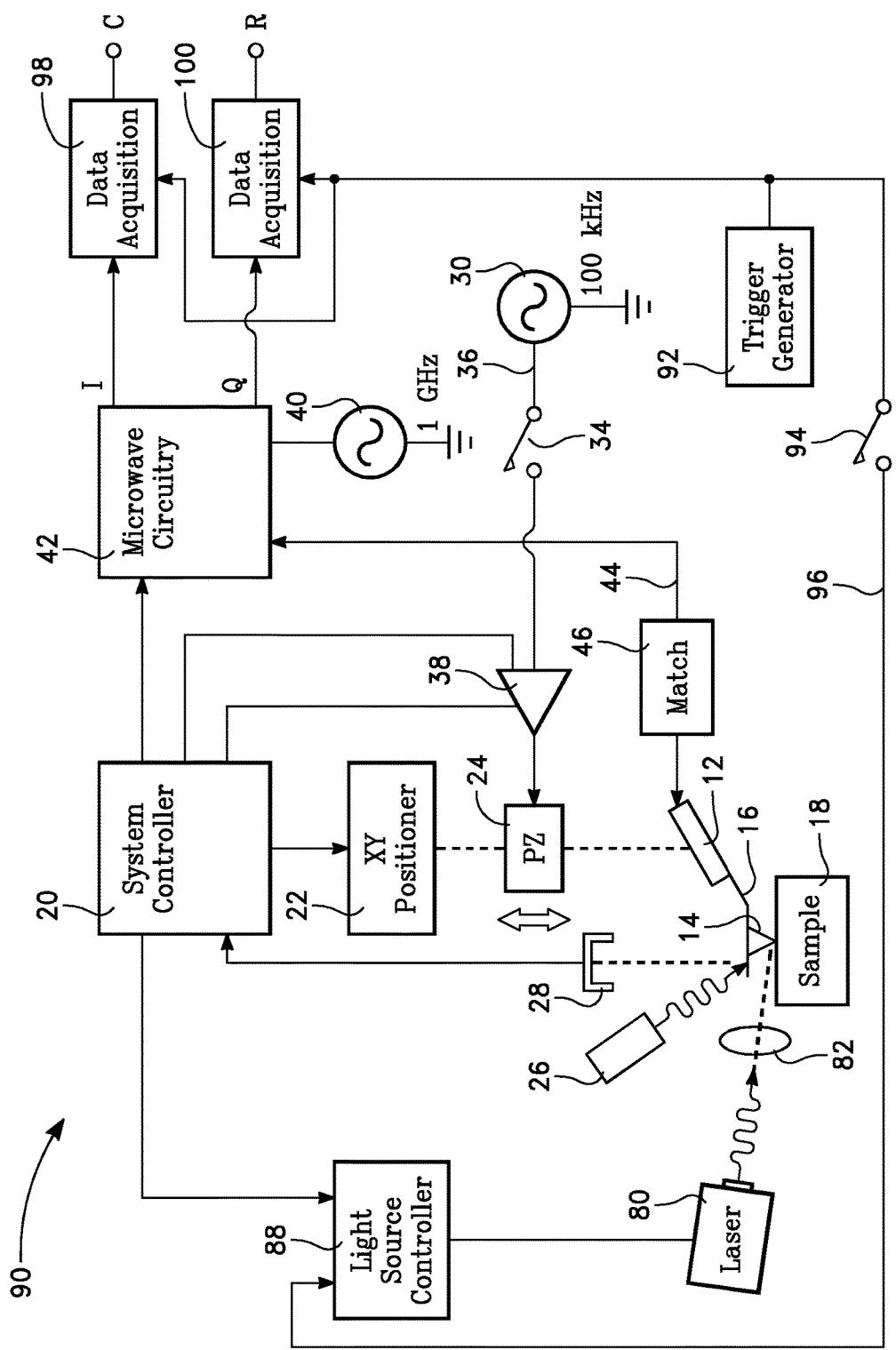
FIG. 3 is a block diagram of an optically excited microwave lifetime microscope system of the invention.

Carrier lifetime is an important measure of the quality of a semiconductor. Its measurement with nanoscale resolution of the semiconductor structure would be highly informative. In a second embodiment of the invention, FIG. 3 illustrates a block diagram of an optically excited lifetime microwave microscope system 90. Most of its parts have been described with reference to FIG. 1. However, the temporal modulation of the laser light source 80 is pulsed with a pulse width ranging, for example, from 10 ns to 10 ms and controlled by trigger generator 92 connected to the light source controller 88 through a closed switch 94 on a line 96. Once the laser light source 80 has irradiated the sample 18 and particularly after the light pulse has ended, two data acquisition units 98, 100 are triggered by the trigger generator 92 to sample the I and Q outputs of the microwave circuitry 42 to provide a time profile of these signals. Their decay times after the light pulse are indicative of the lifetimes of the electrical carriers generated by the light pulse. The digital data acquisition units 98, 100 can be replaced by analog signal processors more directly providing a decay time. The pulsing can be repeated once the I and Q outputs have sufficiently decayed, for example, with pulse periods, for example, of 1 µs to 10 ms. The data acquisition units 98, 100 similarly to the lock-in amplifiers 50, 52 electronically process the output of the microwave circuitry 42 according to the modulating signal controlling the optical irradiation beam.

In the tapping mode for long carrier lifetimes, the measurements can be averaged over the oscillation period of the cantilever. For short carrier lifetimes, it may be necessary to coordinate the triggering with the cantilever oscillation so that the tip is always in the same position when the laser fires and would effectively be stationary during the lifetime measurement. That is, the low-frequency oscillator 30 is connected to a control pin of the trigger generator 92 such that it triggers at a given point on the low-frequency signal. In the contact mode, the cantilever does not oscillate during the lifetime measurement. In the contact mode, the switch 34 is opened so the cantilever 16 does not oscillate and the coordination is not required.

Figure 4:
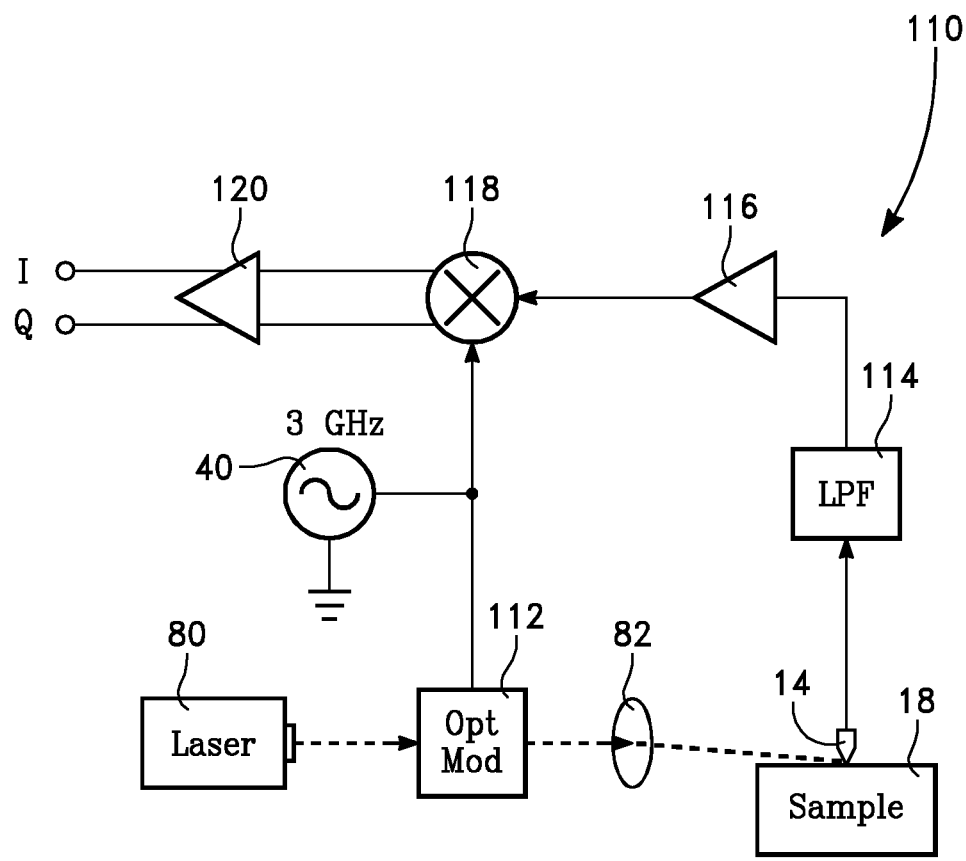
FIG. 4 is a block diagram of a microscope system of the invention which is optically driven at microwave frequencies.

A third embodiment of the invention, illustrated in the simplified block diagram of FIG. 4 for an optically driven microwave microscope system 110, is fundamentally electrically passive and does not require that a microwave signal be electrically applied to the sample. The output of the laser 80, preferably tunable in the range of 1500 to 800 $cm^{-1}$, having an infrared optical frequency $f_{IR}$, is modulated in an optical modulator 112 according to a microwave reference signal from the microwave source 40 operating at $f_{MW}$, which may be 3 GHz. The infrared range is centered at about 10 µm so that the optical or infrared signal frequency $f_{IR}$ is about 4 orders of magnitude greater than the microwave frequency $f_{MW}$. The optical modulator 112 produces a signal which is the product of the optical and microwave signals which has two sidebands at frequencies $f_{IR} \pm f_{MW}$.

The optics 82 focus the modulated beam including its sidebands to an area of the sample 18 surrounding the electrode tip 14 and typically to the tip 14. The tip 14 may be incorporated into the previously described AFM to control the height of the tip 14 relative to the topography of the sample 18. This embodiment of the invention assumes some non-linear interaction among the light, the tip electrode 14, and the sample 18. The microwave signal picked up in the tip electrode 14 passes through a low-pass filter 114 which blocks any signal at frequency greater than the microwave frequency $f_{MW}$ or somewhat higher, such as twice this value $2f_{MW}$. That is, only the signals resulting from the non-linear interaction involving the two sidebands are passed. An RF amplifier 116 amplifies the filtered microwave signal and applies it to one input of a microwave mixer 118 while the microwave source 40 applies the reference microwave signal to the second input of the mixer 88. A DC amplifier 120 amplifies the complex output of the mixer 118 into the I and Q outputs, which are electrically processed by the lock-in amplifiers 50, 52 or data acquisition units 98, 100 or other electronic circuitry locked to or otherwise reliant on the modulating signal of the irradiating optical beam. By scanning the wavelength of the laser 80, an infrared spectrum of the sample 18 can be produced providing information about the resonances and bonding in the sample with spatial resolutions determined by the AFM tip 14.

The second demodulation step of the lock-in amplifiers may not be necessary since the mixer 118 is demodulating the detected signal according to the microwave frequency. That is, the mixer 118 is operating as a gigahertz lock-in amplifier. On the other hand, if the laser has a low-frequency modulation in addition to the gigahertz modulation, e.g., it is pulsed or has a kilohertz modulation, then a second lock-in detection at the kilohertz frequency is advantageous.

The desired non-linearities can arise from a non-linear probe tip, perhaps incorporating a semiconductor junction, or by biasing and depleting non-linear surface portions of the sample.

The microwave modulated light beam of FIG. 4 can be combined with the microwave impedance microscopy system of FIG. 1.

Figure 5:
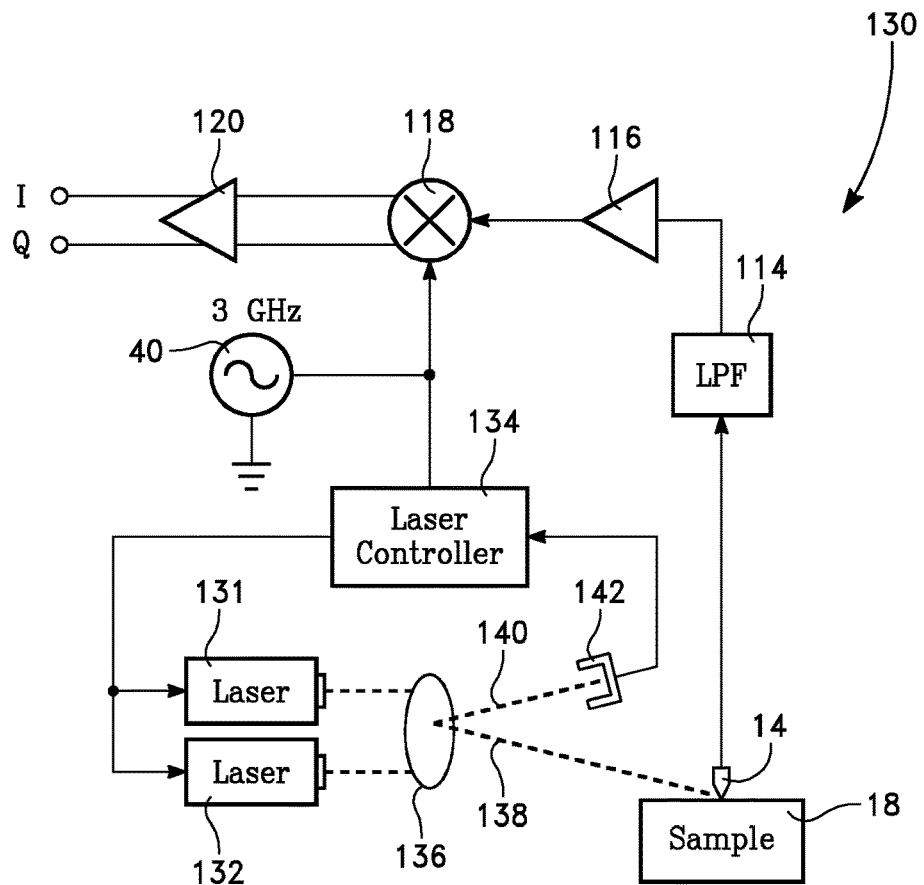
FIG. 5 is a block diagram of an alternative embodiment of the system of FIG. 4 using two beating lasers to provide the modulation.

Another embodiment of an optically driven microwave microscope system 130, illustrated in the block diagram of FIG. 5, does not require modulation of the laser beam itself but allows light modulation in the gigahertz range. Two tunable lasers 131, 132 under the control of a laser controller 134 emit two output beams at slightly different wavelengths and preferably of equal or nearly equal intensities. Optics 136 combine the two output beams into a collinear combined beam 138 irradiating the tip 14 of the AFM probe at the end of the cantilever and the surrounding area of the sample 18. The two laser outputs beat against each other to produce an envelope of the combined beam 138 having a period of the difference frequency. The difference frequency of the two beams output by the lasers 131, 132 is selected to fall in the microwave range, for example, at 3 GHz so that the modulation frequency of one or more components of the laser light incident on the sample 18 is also at 3 GHz and thereby probes the sample 18 at 3 GHz modulation. The generation of gigahertz-modulated light signals is described by Uehara et al. in "Optical beat-note frequency stabilization between two lasers using a radio frequency interferometer in the gigahertz frequency band," *Optical Engineering*, vol. 52, no. 12, 6 pp. 124109 et seq. (December 2014). The electrode tip 14 picks up the microwave signal and passes it through the low-pass filter 114 and RF amplifier 116 to the mixer 118, which demodulates the microwave signal according to the reference microwave signal from the oscillator 40, similarly to the operation of the system 110 of FIG. 4.

The optics 136 also split a fraction of the combined beam 138 into another combined beam 140 directed at a high-speed photodetector 142, which detects the microwave modulation signal in the combined beam 138. The laser controller 134 receives the microwave signal from the detector 142 and compares it to the reference microwave signal from the microwave oscillator 40. If the detected microwave signal differs from the reference microwave signal, the laser controller 134 tunes at least one of the two lasers 131, 132 so that their difference frequency returns to the microwave reference signal, e.g. 3 GHz. The laser controller 134 can also be used to sweep the desired optical frequency range. For example, it can set the first tunable laser 131 to the desired optical wavelength and set the second tunable laser 132 to differ by the desired difference frequency, i.e. by the reference microwave frequency.

The microwave output of the photodetector 142, with proper filtering, amplification and phase adjustment, can be connected via an unillustrated line to the mixer 118 and used instead of the microwave oscillator 40 as the input to the mixer 118, thereby correcting for slow drifts in the system.

Figure 6:
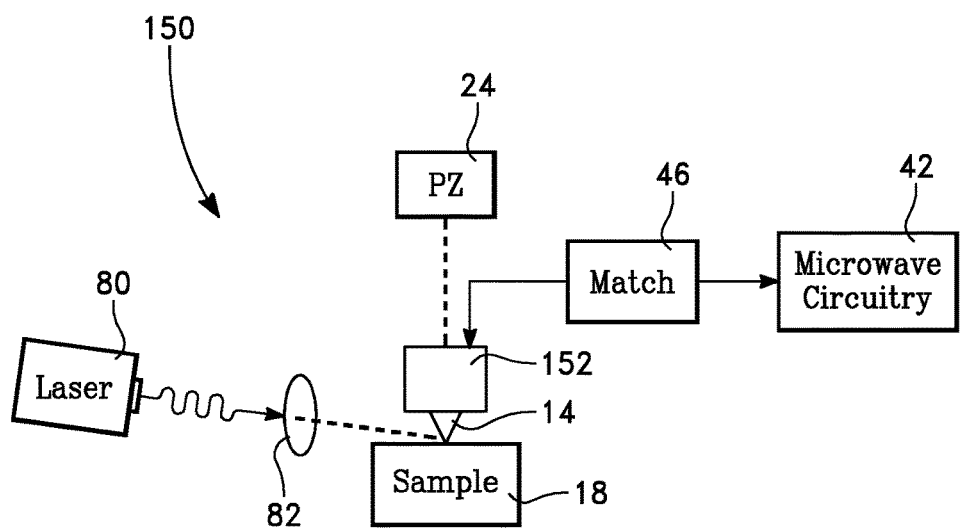
FIG. 6 is a schematic diagram of another optically excited microwave microscope system not including an AFM cantilever.

An alternative embodiment of a microwave measurement system 150 illustrated in the block diagram of FIG. 6 does not require an AFM and its cantilever. Instead, the system 10 of FIG. 1 is modified so that the nanoscale electrode tip 14 is mounted on a holder 152 which is vertically controlled by the piezo-electric element 24 to be in contact or near contact with the sample 18. The electrode tip 14 is connected to the microwave circuitry 42 through the matching circuit 46 and is irradiated by the beam from the tunable laser 80. Either the laser 80 or its beam is modulated at a frequency or wavelength scan used to demodulate the detected microwave signal. As evident from FIG. 6, the invention does not need to be integrated with an AFM system and nanoscale probe tips are not always required if the required resolution is coarser, for example, an tip apex of up to 10 μm in diameter.

Other systems of the invention may include different portions of the described embodiments including atomic force microscopy, microwave signals passing through the AFM probe tip, optical beams irradiating the sample around the probe tip and modulated according to excitation frequency, and electrical circuitry processing a microwave signal from the probe tip in comparison with the excitation frequency. The cantilever of the AFM system may be substituted by a tuning fork mounting the electrode tip on the end of one of its forks.

Although the invention has been primarily described with respect to inspection of semiconductor and integrated circuit structures, it can be applied to other technologies, such as material science and chemistry in which bonding and vibrational states are important. It can also be applied to medical and biological problems.

The materials characterization system of the invention provides additional capability of measuring electronic and atomic properties sensitive to excitation at the optical frequencies but capable of being based on currently available AFM systems.

The invention claimed is:

1. An optically driven material analyzer, comprising:
an electrode tip which is positionable along an axis relative to a sample to interact with a sampling area of the sample;
a source of a first microwave signal having a first microwave frequency in a microwave range between 100 MHz and 40 GHz;
a light source outputting a source beam of optical radiation having a component at a selected optical wavelength of no more than 100 μm which is modulated according to the first microwave signal and irradiating the sampling area with the modulated component of the optical radiation; and
microwave circuitry receiving at least a second microwave signal having a second microwave frequency in the microwave range from the electrode tip and processing the second microwave signal to produce at least one electrical signal indicative of an interaction of the optical radiation with the sample.

2. The analyzer of claim 1, wherein the microwave circuitry processes the second microwave signal together with a third microwave signal having a third microwave frequency in the microwave range and derived from the first microwave signal to produce the at least one electrical signal.

3. The analyzer of claim 2, wherein the second microwave frequency equals the first microwave frequency.

4. The analyzer of claim 1, wherein the electrode tip includes an apex having a diameter of no more than 100 nm.

5. The analyzer of claim 1, further comprising an optical modulator receiving the source beam and modulating it according to the first microwave signal.

6. The analyzer of claim 1, wherein the light source includes two lasers emitting respective beams at respective optical frequencies differing by an optical frequency corresponding to the first microwave frequency.

7. The analyzer of claim 1, further comprising:
an actuator supporting a flexible arm on which is mounted the electrode tip to cause it to move toward and away from the sampling area; and
a low-frequency oscillator capable of oscillating the arm at a resonant frequency thereof.

8. The analyzer of claim 1, further comprising:
a flexible support on a distal end of which is mounted the electrode tip; and
a low-frequency oscillator capable of oscillating the distal end to cause the electrode tip to move toward and away from the sampling area at a mechanical frequency in a range of 30 to 300 kHz.

9. The analyzer of claim 1, further comprising:
an actuator oscillating the electrode tip relative to the sampling area;
a low-frequency oscillator operating at an oscillation frequency less than the microwave range and controlling the actuator to determine an oscillation period of the electrode tip corresponding to the oscillation frequency; and
a trigger responsive to a phase of the low-frequency oscillator to enable the light source for a length of time less than the period of the low-frequency oscillator, whereby the at least one electrical signal is measured during a restricted portion of the oscillation period.

10. The analyzer of claim 1, further comprising:
a flexible support on a distal end of which is mounted the electrode tip;
a low-frequency oscillator operating at an oscillation frequency less than the microwave range and controlling a physical oscillation of the distal end to determine an oscillation period corresponding to the oscillation frequency; and
a trigger responsive to a phase of the low-frequency oscillator to enable the light source for a length of time less than the oscillation period, whereby the at least one electrical signal is measured during a restricted portion of the oscillation period.

11. The analyzer of claim 10, wherein the oscillation frequency lies in a range of 30 to 300 kHz.

12. An optically driven material analyzer, comprising:
an electrode tip which is positionable along an axis relative to a sample to interact with a sampling area of the sample;
a first optical light source and a second optical light source emitting respective first and second optical beams at respectively a first optical frequency and a second optical frequency each corresponding to respective optical wavelengths of no more than 100 μm, at least one of the first and second optical light sources being wavelength tunable to vary its optical frequency of its emitted optical beam;
a controller controlling the first and second optical frequencies of the first and second optical light sources to differ by an optical difference frequency in a microwave range of 100 MHz to 40 GHz;
optics combining the first and second optical beams into a combined beam of radiation irradiating the sampling area; and
microwave circuitry receiving a received microwave signal in the microwave range from the electrode tip and processing it to produce at least one electrical signal indicative of an interaction of irradiating radiation with the sample.

13. The analyzer of claim 12, further comprising a source of a reference microwave signal in the microwave range input to the controller to control the optical difference frequency, wherein the microwave circuitry combines the reference microwave signal with the received microwave signal to produce the at least one electrical signal.

14. The analyzer of claim 12, further comprising an optical detector receiving a portion of the combined beam and inputting its signal to the controller to thereby control the optical difference frequency.

15. The analyzer of claim 12, further comprising an optical detector receiving a portion of the combined beam, wherein the microwave circuitry combines an output of the optical detector with the received microwave signal to produce the at least one electrical signal.

16. The analyzer of claim 12, wherein the electrode tip has an apex with a diameter about the axis of no more than 100 nm.

17. An optically excited materials analyzer, comprising:
an electrode tip having an apex with a diameter about an axis;
a flexible support projecting to a distal end thereof on which the electrode tip is mounted allowing the electrode tip to move along the axis to and away from a sampling area of a sample;
a laser source irradiating the sampling area with a laser beam of optical radiation having a component with a wavelength of no more than 200 μm; and
microwave circuitry (1) receiving detected signals from the electrode tip in a first microwave frequency range between 100 MHz and 40 GHz, and (2) producing at least one electrical signal indicative of an interaction of the component of the optical radiation with the sample.

18. The analyzer of claim 17, wherein the diameter is no more than 100 nm.

19. The analyzer of claim 17, further comprising a low-frequency oscillator outputting a signal below the microwave frequency range capable of causing the distal end to oscillate at a physical resonance thereof.

20. The analyzer of claim 17, further comprising a source of a source microwave signal having a second microwave frequency in the microwave frequency range and modulating the laser beam according to the second microwave frequency.

* * * * *